United States Patent
Chu et al.

(10) Patent No.: US 7,646,876 B2
(45) Date of Patent: Jan. 12, 2010

(54) SYSTEM AND METHOD FOR STEREO OPERATION OF MICROPHONES FOR VIDEO CONFERENCING SYSTEM

(75) Inventors: Peter Chu, Lexington, MA (US); Anthony M Duys, Merrimac, MA (US)

(73) Assignee: Polycom, Inc., Pleasanton, CA (US)

( * ) Notice: Subject to any disclaimer, the term of this patent is extended or adjusted under 35 U.S.C. 154(b) by 912 days.

(21) Appl. No.: 11/095,900

(22) Filed: Mar. 30, 2005

(65) Prior Publication Data

US 2006/0221177 A1    Oct. 5, 2006

(51) Int. Cl.
*H04R 3/00*    (2006.01)
(52) U.S. Cl. .......................... 381/92; 381/91; 381/122; 381/77; 381/80; 348/14.01; 348/14.08; 348/14.09
(58) Field of Classification Search .................... 381/56, 381/91–92, 11, 82, 85, 122, 77, 80, 306; 348/14, 8, 202.01, 245, 259, 14.16, 14.01, 348/14.1, 14.07–14.09
See application file for complete search history.

(56) References Cited

U.S. PATENT DOCUMENTS

| 4,421,957 | A | | 12/1983 | Wallace, Jr. |
| 4,751,738 | A | | 6/1988 | Widrow et al. |
| 5,422,956 | A | * | 6/1995 | Wheaton ..................... 381/122 |
| 5,778,082 | A | | 7/1998 | Chu et al. |
| 6,173,059 | B1 | * | 1/2001 | Huang et al. ................. 381/92 |
| 6,668,062 | B1 | | 12/2003 | Luo et al. |
| 6,783,059 | B2 | * | 8/2004 | Laskaris et al. .............. 324/318 |
| 6,922,206 | B2 | | 7/2005 | Chu et al. |
| 6,983,055 | B2 | * | 1/2006 | Luo ............................ 381/313 |
| 7,123,727 | B2 | | 10/2006 | Elko et al. |
| 7,130,705 | B2 | * | 10/2006 | Amir et al. .................... 700/94 |
| 7,206,421 | B1 | | 4/2007 | Taenzer |
| 7,460,677 | B1 | | 12/2008 | Soede et al. |
| 2003/0031334 | A1 | * | 2/2003 | Layton et al. ................ 381/310 |
| 2005/0008169 | A1 | * | 1/2005 | Muren et al. ................... 381/92 |
| 2005/0058300 | A1 | * | 3/2005 | Suzuki et al. ................. 381/92 |
| 2007/0064925 | A1 | * | 3/2007 | Suzuki et al. .......... 379/420.01 |

* cited by examiner

*Primary Examiner*—Vivian Chin
*Assistant Examiner*—Disler Paul
(74) *Attorney, Agent, or Firm*—Wong, Cabello, Lutsch, Rutherford & Brucculeri, LLP

(57) ABSTRACT

A microphone bar for obtaining audio input for a video conferencing system includes a master module and one or more slave modules. The master module houses a first pair of unidirectional microphones for obtaining audio from opposite sides of the bar, and each of the slave modules houses a second pair of unidirectional microphones for obtaining audio from opposite sides of the bar. Extensions connect the modules together, and at least one bus conducts audio signals through the extension from the microphones to the video conferencing system. The microphones are operable according to a broadside mode of stereo operation when a central axis of the bar is substantially orthogonal to a view angle of the conferencing system. Furthermore, the microphones are operable according to an end-fire mode of stereo operation when the central axis of the bar is substantially parallel to the view angle of the conferencing system.

40 Claims, 14 Drawing Sheets

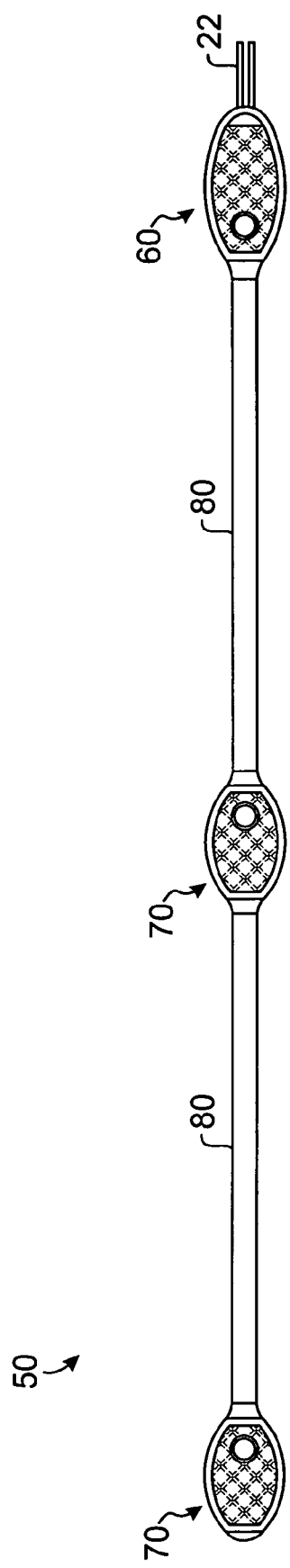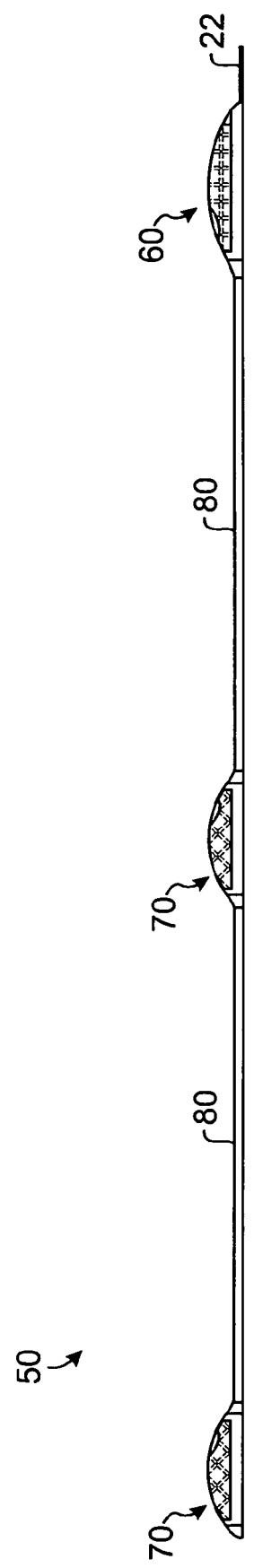

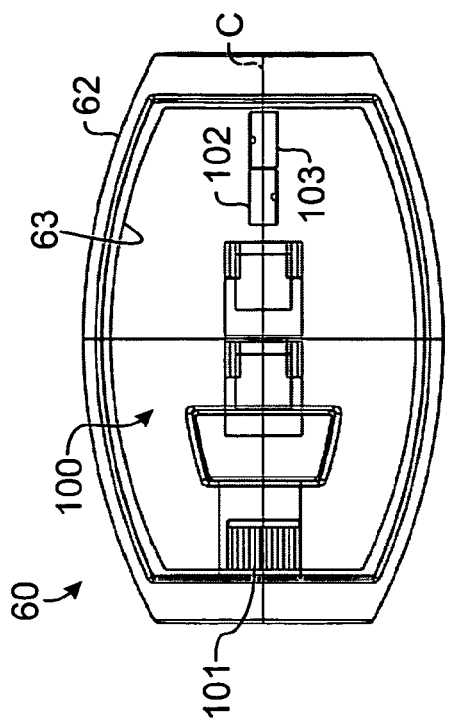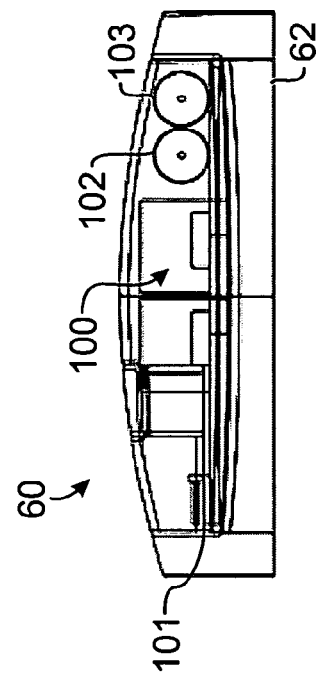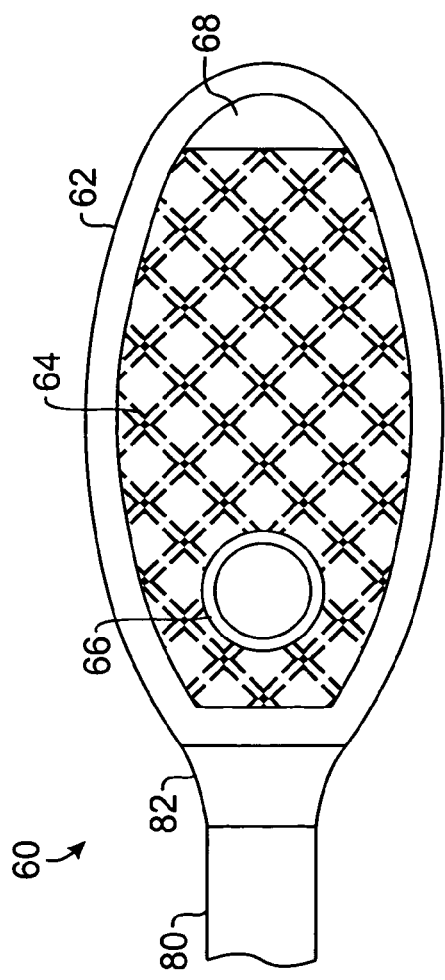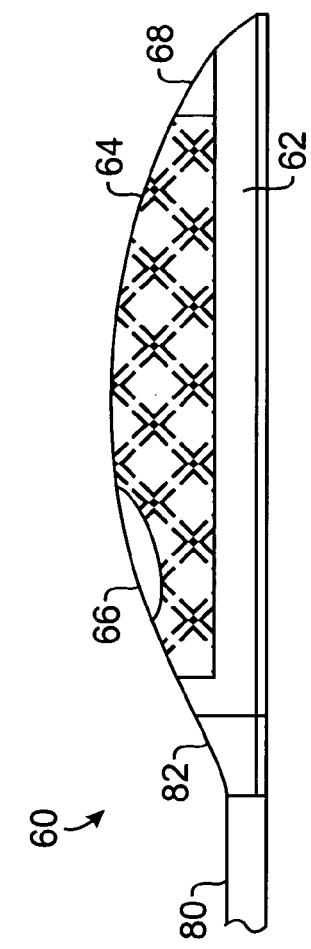

SYSTEM AND METHOD FOR STEREO OPERATION OF MICROPHONES FOR VIDEO CONFERENCING SYSTEM

FIELD OF THE INVENTION

The subject matter of the present disclosure generally relates to a system and method for stereo operation of microphones of a videoconferencing system and more particularly relates to a microphone bar or a plurality of microphone modules for a videoconferencing system capable of at least two modes of stereo audio operation depending of the orientation of the microphone modules relative to other components of the videoconferencing system.

BACKGROUND OF THE INVENTION

Teleconferencing has long been an essential tool for communication in business and other areas. One type of teleconferencing system is a video conferencing system, which transmits real-time video as well as live audio between participants of the conference. The video conferencing system typically has a video processing portion and an audio processing portion. The video processing portion includes a camera to capture real-time video of the participants and a video display for showing real-time images of the remote participants. The audio portion includes one or more microphones to pick up voice signals of the participants and includes loudspeakers to reproduce voices of the remote participants.

Frequently, it is desirable to use more than one microphone during a conference. For example, a single microphone will have difficulty picking up voices from participants sitting far away from the microphone. Therefore, a number of microphones are typically used. In addition, it is often desirable to conduct conferences in stereo because stereo reproduces the spatial relationship between various sound sources, making speech from different participants more distinguishable and intelligible to remote viewers. To meet the needs of conducting a video conference in stereo with multiple microphones, it is known in the art to build customized rooms for video conferences. In a customized room, a number of microphones are typically mounted in fixed locations relative to a display and a camera, and the conferencing equipment and microphones are configured for the best arrangement for conducting audio in the room.

However, not all video conferences are conducted in customized rooms. More often, video conferencing equipment is mobile and is moved between rooms depending on the needs of the users, or the video conferencing equipment is not specifically customized for the room. Therefore, there is no fixed arrangement of microphones, display, camera, etc. for best reproducing audio information. Consequently, a number of problems may occur when multiple microphones are used in a video conference and there is no fixed arrangement for best reproducing the audio. For example, signals from microphones where no one is speaking may be substantially noise. If all signals from all microphones are mixed together, a large number of noise signals are mixed with voice signals, reducing the signal to noise ratio, while still providing a known spatial relationship between the microphones.

Therefore, it would be beneficial for a video conferencing system to be capable of mono and stereo audio operation and to be adaptable to changed locations and various arrangements depending on the needs of a user. The subject matter of the present disclosure is directed to overcoming, or at least reducing the effects of, one or more of the problems set forth above.

SUMMARY OF THE DISCLOSURE

A microphone bar for obtaining mono or stereo audio input for a video conferencing system includes a master module and one or more slave modules. The master module houses a first pair of microphones for obtaining audio, and each of the slave modules houses a second pair of microphones for obtaining audio. Each of the microphones is unidirectional, and the microphones of each pair are directed in opposing directions. Extensions connect the modules together, and the microphone bar has an elongated body. At least one bus conducts audio signals through the extension from the microphones to the video conferencing system. The microphones are operable according to a broadside mode of stereo operation when a central axis of the bar is substantially orthogonal to a view angle of the conferencing system. Furthermore, the microphones are operable according to an end-fire mode of stereo operation when the central axis of the bar is substantially parallel to the view angle of the conferencing system. The modes of stereo operation make the microphone bar adaptable to various arrangements of the conferencing system depending on the needs of the user.

The foregoing summary is not intended to summarize each potential embodiment or every aspect of the present disclosure.

BRIEF DESCRIPTION OF THE DRAWINGS

The foregoing summary, preferred embodiments, and other aspects of the subject matter of the present disclosure will be best understood with reference to a detailed description of specific embodiments, which follows, when read in conjunction with the accompanying drawings, in which:

FIGS. 4A-4B illustrate an embodiment of a unit having a plurality of interconnected microphone modules according to certain teachings of the present disclosure in plan and side views.

FIGS. 5A-5D illustrate various views of a master module of the microphone bar of FIGS. 4A-4B.

Figure 1:
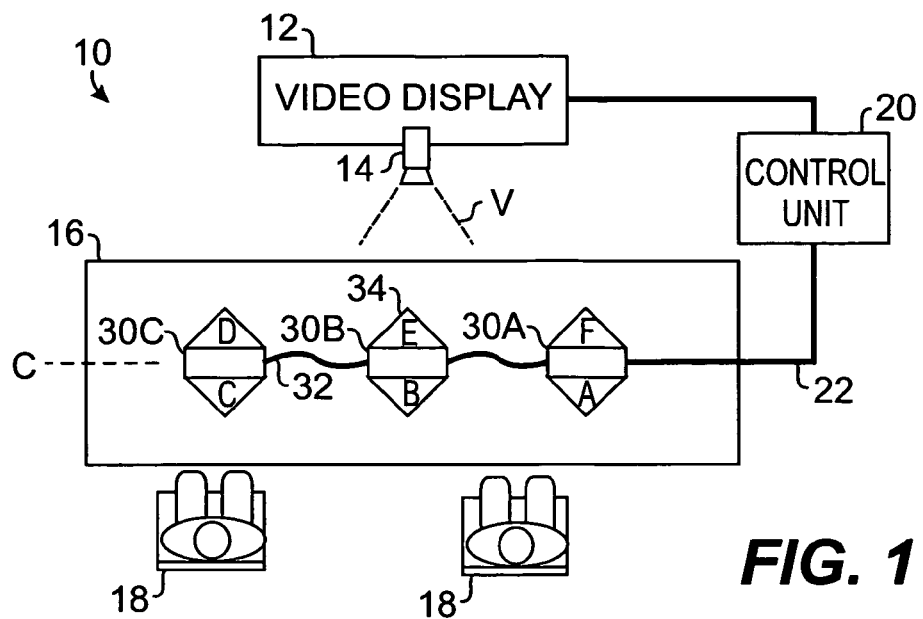
FIG. 1 illustrates a video conferencing system having a plurality of microphones according to certain teachings of the present disclosure in a broadside position.

While the disclosed video conferencing system and microphone bar are susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Figure 2:
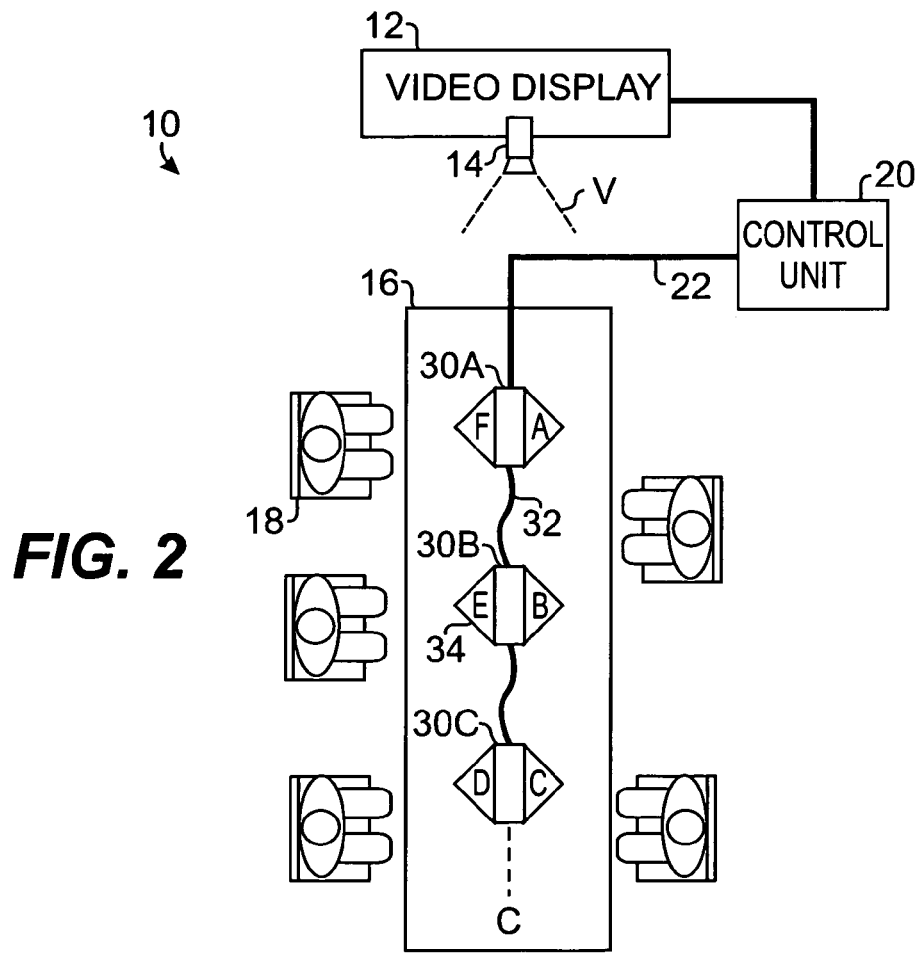
FIG. 2 illustrates the video conferencing system of FIG. 1 in an end-fire position.

Referring to FIGS. 1 and 2, a video conferencing system 10 includes a video display 12, a camera 14, a control unit 20, and a microphone bar 30. A plurality of microphone modules 30A-C are placed on a table 16 where participants 18 are seated. Although the modules 30A-C are shown for placement on a table 16, it will be appreciated with the benefit of the present disclosure that the modules 30A-C can be positioned throughout a room and can be fixtures attached to walls, the ceiling, or other locations of a room. As a typical arrangement for a videoconference, the participants 18 face the video display 12 to view other remote participants of the video conference, and the camera 14 is situated adjacent or on top of the display 12 so that as the participants 18 view the display 12 they will appear to be looking at the remote participants as well.

In the arrangement of FIG. 1, the microphone modules 30A-C are shown in a broadside position (i.e., a central axis C defined by the arrangement of the modules 30A-C is substantially orthogonal to a view angle V of the camera 14). Thus, the participants 18 can be and typically are positioned on only one side of the table 16. Of course, the modules 30A-C in FIG. 1 can be oriented in an alternative broadside position if rotated 180-degrees from how it is shown in FIG. 1.

In the arrangement of FIG. 2, however, the microphone modules 30A-C are in an end-fire position (i.e., the central axis C of defined by the arrangement of the modules 30A-C is substantially parallel to the view angle V of the camera 14). Thus, the participants 18 can be and typically are positioned on both sides of the table 16. Of course, the modules 30A-C in FIG. 2 can be oriented in an alternative end-fire position if rotated 180-degrees from how it is shown in FIG. 2.

Figure 3A:
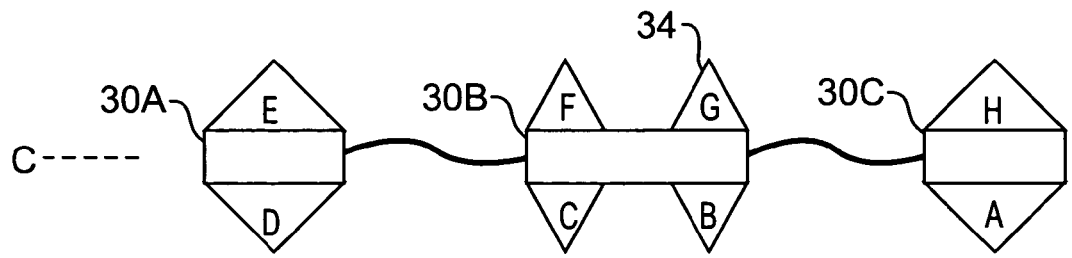
FIGS. 3A-3C illustrated various embodiments of modules having a plurality of microphones.

Each microphone module 30A-C includes a body 32 housing microphones 34. The microphones 34 are preferably unidirectional and are substantially directed towards opposite sides of the modules 30A-C. In the present embodiment, the modules 30A-C are interconnected to one another by cables 32 and connected to the control unit 20 by cable 22. In an alternative embodiment, each module 30A-C can be separately connected to the control module 20. In yet another alternative embodiment discussed below with reference to FIGS. 3A-3B, the microphone modules 30A-C can be physically interconnected together by connection or extension members to form a microphone bar. In the present embodiment of FIGS. 1 and 2, three modules 30A-C are shown, and each module 30A-C has a pair of microphones 34 so that six microphones 34-A to 34-F are shown in FIGS. 1 and 2. However, it is understood that two or more microphone modules can be used for the videoconferencing system 10 and that each module 30A-C can have one or more microphones 34.

The control unit 20 for the video conferencing system 10 contains signal processing circuitry, control circuitry, network interfaces, etc. and connects to the microphones 34, video display 12, and camera 14. Details of the control unit 20 are provided below with reference to FIG. 8. In one embodiment, the control unit 20 and camera 14 can be an integrated unit, such as a Polycom® View Station FX™, which rests on a conventional television display 12. The six microphones 34 are connected to the control unit 20 via one or more lines 22. The connection can be a conference link bus for digital or analog line level outputs. In either case, the signals from the microphones 34 are sent digitally or via analog means to the control unit 20.

The microphone modules 30A-C can be operated in mono audio operation in either the broadside or end-fire positions of FIG. 1 or 2. Gating techniques may be used to select the microphone(s) 34 that are best able to pick up the participants 18 talking during mono operation. Details of suitable gating techniques are disclosed in U.S. patent application Ser. No. 10/881,008, filed Jun. 30, 2004 and entitled "Stereo Microphone Processing for Teleconferencing," which is incorporated herein by reference in its entirety.

The microphone modules 30A-C can also be operated in at least two modes of stereo audio operation for the broadside or end-fire positions of FIG. 1 or 2. For example, the microphone modules 30A-C are operated in a broadside mode of stereo operation when the modules 30A-C are in the broadside position of FIG. 1. In this broadside mode, the microphones 34-D through 34-F on the side of the modules 30A-C closest to the camera 14 are deactivated, and the other microphones 34-A through 34-C on the other side of the modules 30A-C are divided into left and right sides of stereo audio input, respectively. In this way, when a participant 18 on the "left" side of the table speaks (from the perspective of the camera 14), the first microphone 34-A will pick up the speaker's voice, and the remote participants will hear this speaker's voice from the left loudspeaker of their remote display.

When the modules 30A-C are in the end-fire position of FIG. 2, an end-fire mode of stereo operation is used. In this end-fire mode, the microphones 34-D through 34-F are summed together and used for the right side of the stereo audio input. Likewise, the microphones 34-A through 34-C are summed together and used for the left side of the stereo audio input. In this way, when a participant 18 on the "right" side of the table 16 speaks (from the perspective of the camera 14), the right stereo input microphones 34-D through 34-F will pick up the speaker's voice, and the remote participants will hear this speaker's voice from the right loudspeaker of their remote display.

In the embodiment of FIGS. 1 and 2, each module 30A-C has a pair of microphones 34. However, it is understood that each module 30 can employ one or more microphones 34. In one alternative embodiment shown in FIG. 3A, one or more of the modules (e.g., module 30B) can have four microphones (e.g., microphones 34B, 34C, 34F, 34G) in a square arrangement on the module 30B. With four microphones, it is possible to position two of the microphones 34B, 34C on one side of a central axis C defined by the modules 30 and two microphones 34F, 34G on another side of the central axis C.

Figure 3B:
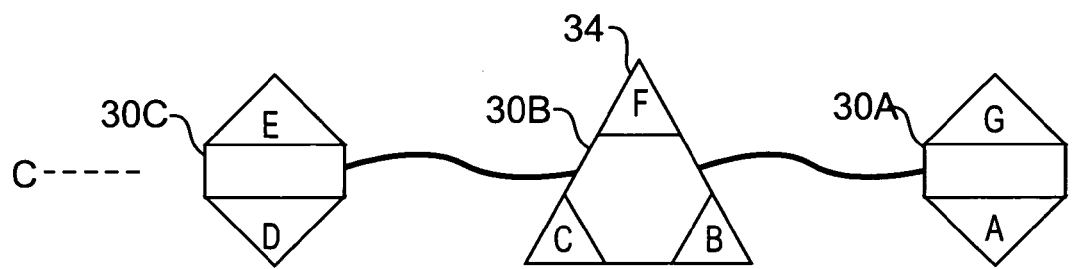

In another alternative embodiment shown in FIG. 3B, one or more of the modules (e.g., module 30B) can have three microphones (e.g., microphones 34B, 34C, 34F) arranged in a triangular arrangement. For such a triangular module, it is possible to position the triangular module 30B with one of the three microphones 34 F on one side of a central axis C defined by the modules 30 and two microphones 34B, 34C on another side of the central axis C. A VSX Mic Pod, which is available from Polycom, Inc. and has three cardioid microphones pointing radially outward at about 120-degrees apart from one another, is one commercial example suitable for use as module 30B.

Figure 3C:
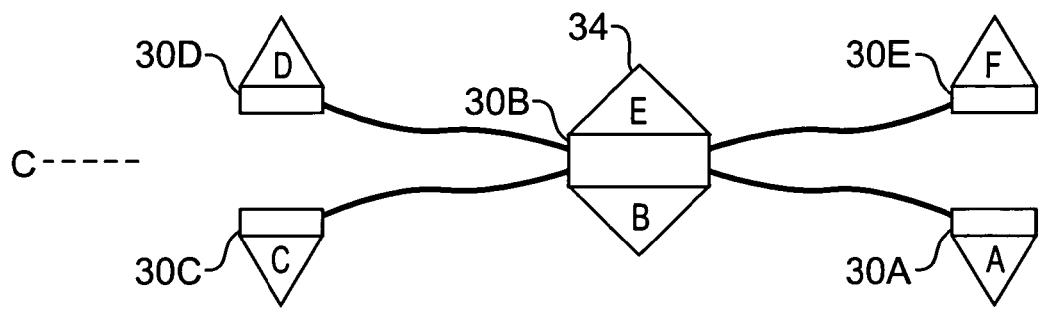

In yet another alternative embodiment shown in FIG. 3C, one or more of the modules (e.g., modules 30A, 30C, 30D, 30E) can have one microphone 34 and can be arranged toward one or the other side of the central axis C defined by the modules 30. Given the various modules and arrangements shown in FIGS. 3A-3C, for example, it will be appreciated by one skilled in the art that various numbers of modules having various numbers of microphones can be arranged according to the teachings of the present disclosure.

In FIGS. 1 and 2, the modules 30A-C have separate housings for the microphones 34 that are interconnected by cables 32. By using separate modules 30A-C, it will be necessary for users of the system to appropriately arrange the modules 30A-C relative to one another depending on the desired mode of operation. As noted briefly above, however, the modules 30A-C in an alternative embodiment of the present disclosure can be physically interconnected together to form a microphone bar. Therefore, the discussion now turns to description of an embodiment of a microphone bar having interconnected modules.

Referring to FIGS. 4A-4B, an embodiment of a microphone bar 50 according to certain teachings of the present disclosure is illustrated in plan and side views, respectively. The microphone bar 50 includes a master module 60 and one or more slave modules 70 attached by extension members 80. As shown in FIGS. 4A-4B, the extension members 80 and slave modules 70 are mounted from one end of the master module 60. However, different arrangements of the master module 60 and slave modules 70 are possible. For example, the master module 60 may be centrally located with slave modules 70 and extensions 80 mounted at either end.

The master module 60 and each of the slave modules 70 include two microphones (not shown) for detecting audio signals from opposing sides of the microphone bar 50. Each extension member 80 includes a bus or cable (not shown) for carrying the plurality of signals from the various microphones along the microphone bar 50. The master module 60 connects to one or more cables 22 that communicate with the control unit (not shown) of the video conferencing system.

In one embodiment, the modules 60 and 70 and extension members 80 are modular, which allows various numbers of slave modules 70 and various lengths of extension members 80 to be used with the master module 60. Thus, the ends of the extension members 80 can have releasable connections to the modules 60 and 70. In one embodiment, the extension members 80 can have fixed lengths and can be made of aluminum or other rigid material. For example, the extension members 80 can have any desirable length, such as three feet. In addition, the length of the microphone bar 30 can be as short as two feet or as long as nine feet, for example. In an alternative embodiment, the extension members 80 can have variable lengths, as discussed below with reference to FIG. 8.

Referring to FIGS. 5A-5D, various views of a master module 60 of the microphone bar of FIGS. 4A-4B are illustrated. As shown in FIGS. 5A-5B, the master module 60 can be positioned at the end of the microphone bar so that an extension member 80a connects to one end of the master module 60. As best shown in FIG. 5C, the master module 60 includes electronics 100 positioned within a cavity 63 of a housing 62. The electronics 100 include two unidirectional microphones 102 and 104 mounted in the module 60 and facing in opposite, outward directions from a central axis C. Preferably, the microphones 102 and 104 are cardioid, unidirectional microphones, such as Primo EM-110.

In addition, the electronics 100 of the master module 60 include audio-to-digital (A/D) converters, microphone preamps, and other audio and signal processing hardware. For example, the electronics 100 include a connector 101 for connecting to the bus (not shown) embedded in the extension member 80 and includes other hardware (not shown) for connecting to the one or more cables (not shown) to the control unit (not shown).

As best shown in FIGS. 5A-5B, a mesh 64 covers the cavity 63 and allows for passage of sound waves to the microphones 102 and 103 within the module 60. The module 60 can include a mute button 62 for deactivating the microphones 102, 103 in the module 60. Furthermore, the master module 60 can include an infrared (IR) sensor 68 for detecting infrared signals of a remote used to control the operation of the control unit. Typically, the control unit of the video conferencing system has an IR sensor for detecting signals from a remote. However, when the video conferencing system is set up in a large room, signals from the remote may not reach the IR sensor on the control unit, which typically can detect IR signals from up to 20-feet away. By incorporating the IR sensor 68 in the master module 60 and communicating detected signals from the master module 60 to the control unit, the IR sensor 68 will more likely be located near the participant using the remote so that the sensor 68 can better detect the signals from the remote and send the control signals to the control unit.

Figure 6A:
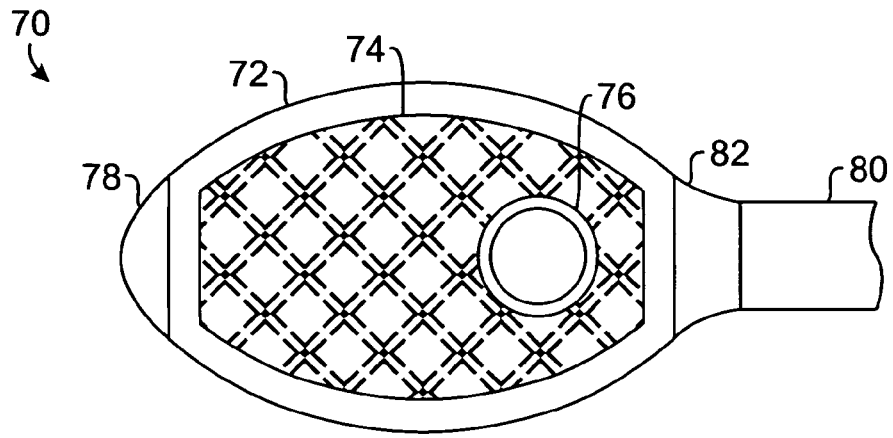
FIGS. 6A-6C illustrate various views of a slave module of the microphone bar of FIGS. 4A-4B.
Figure 6B:
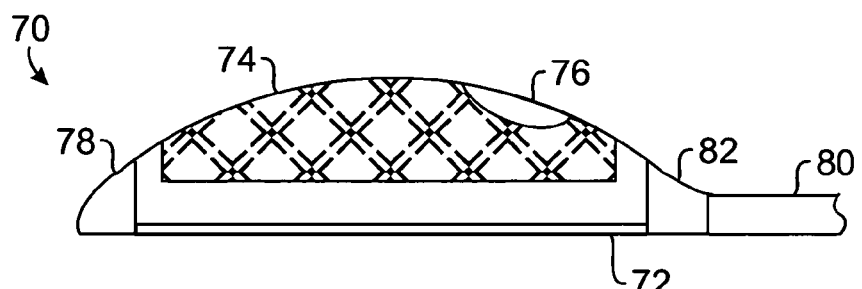
Figure 6C:
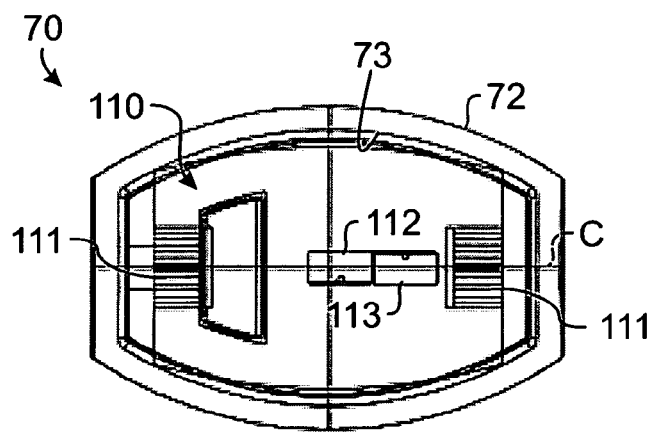

Referring to FIGS. 6A-6C, various views of a slave module 70 of the microphone bar of FIGS. 4A-4B are illustrated. As shown in FIGS. 6A-6B, the slave module 70 can be at the end the microphone bar so that an extension member 80 can connect to one end of the slave module 70. As noted previously, however, the slave module 70 can be mounted in a central location of the microphone bar so that another extension member (not shown) could be connected to the other end of the module 70. If the slave module 70 is mounted on the end of the microphone bar as shown in FIGS. 6A-6B, an end cap 78 can be attached to the end of the module 70 to hide the connection portion of the module 70.

As best shown in FIG. 6C, the slave module 60 includes electronics 110 within a cavity 73 of a housing 72. As with the master module described above, the electronics 110 include two unidirectional microphones 112 and 113 mounted in the module 70 and facing in opposite, outward directions. Preferably, the microphones 112 and 113 are cardioid, unidirectional microphones, such as Primo EM-110. In addition, the electronics 110 in the slave module 70 includes A/D converters, microphone preamps, and other audio and signal processing hardware, such as connectors 111. As best shown in FIGS. 6A-6B, a mesh 74 covers the cavity 73 and allows for passage of sound waves to the microphones 112 and 113 within the housing 72, and the module 70 can include a mute button 72 for deactivating the microphones in the module 70.

Figure 7:
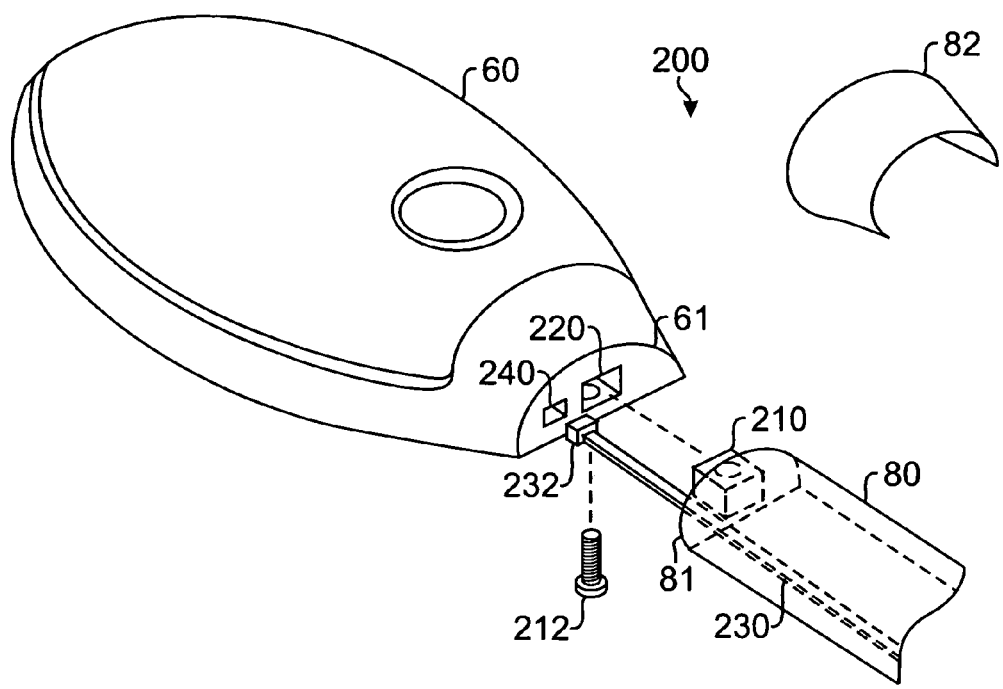
FIG. 7 illustrates an embodiment of a connection between an extension member to a module of the disclosed microphone bar.

Referring to FIG. 7, one embodiment of a connection 200 between an extension member 80 to a module 60 is illustrated. An end 81 of the extension member 80 has a mating member 210 that couples with a complementary mating member 220 on an end 61 of the module 60. Preferably, a fastener 212 is used to fasten the ends 61 and 81 once the mating members 210 and 220 are coupled together. It will be appreciated that various techniques for connecting the extension member 80 to the module 60 can be employed. For example, in an alternative embodiment, the mating members 210 and 220 can include integral fasteners such that they snap fit together.

The bus or cable 230 is embedded in the extension member 80. The end of the bus 230 has a connector 232 that connects to a corresponding connector 240 on the module 60. It will also be appreciated that various techniques for connecting the bus 230 to the electronics (not shown) within the module 60 can be employed. For example, the connectors 232 and 240 can include socket or other suitable electronic connectors. An aesthetic cover 82 can fit over the connection between the ends 61 and 81 of the module 60 and extension member 80.

Figure 8:
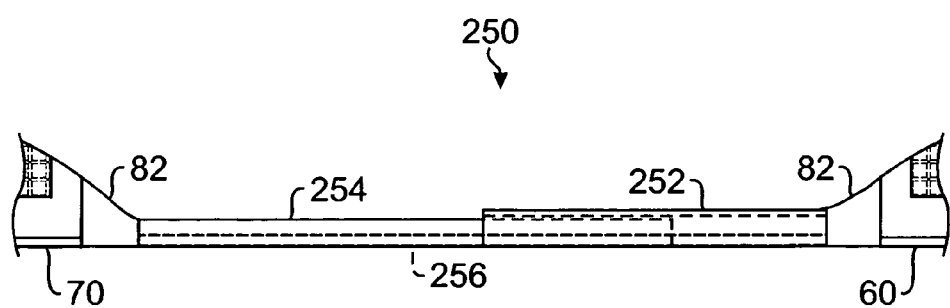
FIG. 8 illustrate an embodiment of an extendable extension member.

Referring to FIG. 8, an embodiment of an extendable extension member 250 is illustrated in a side view. In this embodiment, the extension member 250 does not have a fixed length. Instead, the length of the extension member 250 can be changed to alter the distance between modules 60 and 70 of the microphone bar. The extendable extension member 250 includes first and second telescoping members 252 and 254. The second member 254 fits within a channel of the first member 252 such that the second member 254 can be moved in and out of the first member 252 to extend or shorten the length of the extendable extension member 250. The second member 254 also has a channel, and a bus 256 passes through the first and second members 252 and 254 to carry electrical signals between the modules 60 and 70. The bus 256 is preferably a serial bus for carrying a plurality of signals from the multiple microphones of the microphone bar.

As noted above, the disclosed videoconferencing system and microphone modules (either separate or interconnected into a microphone bar) can be operated in either mono or stereo operation. Because the microphone modules can be arranged in broadside or end-fire positions as in FIGS. 1 and 2, a number of techniques are disclosed below in FIGS. 9 through 17 for setting up the microphone modules and for manually or automatically selecting the mode of audio operation.

Figure 9:
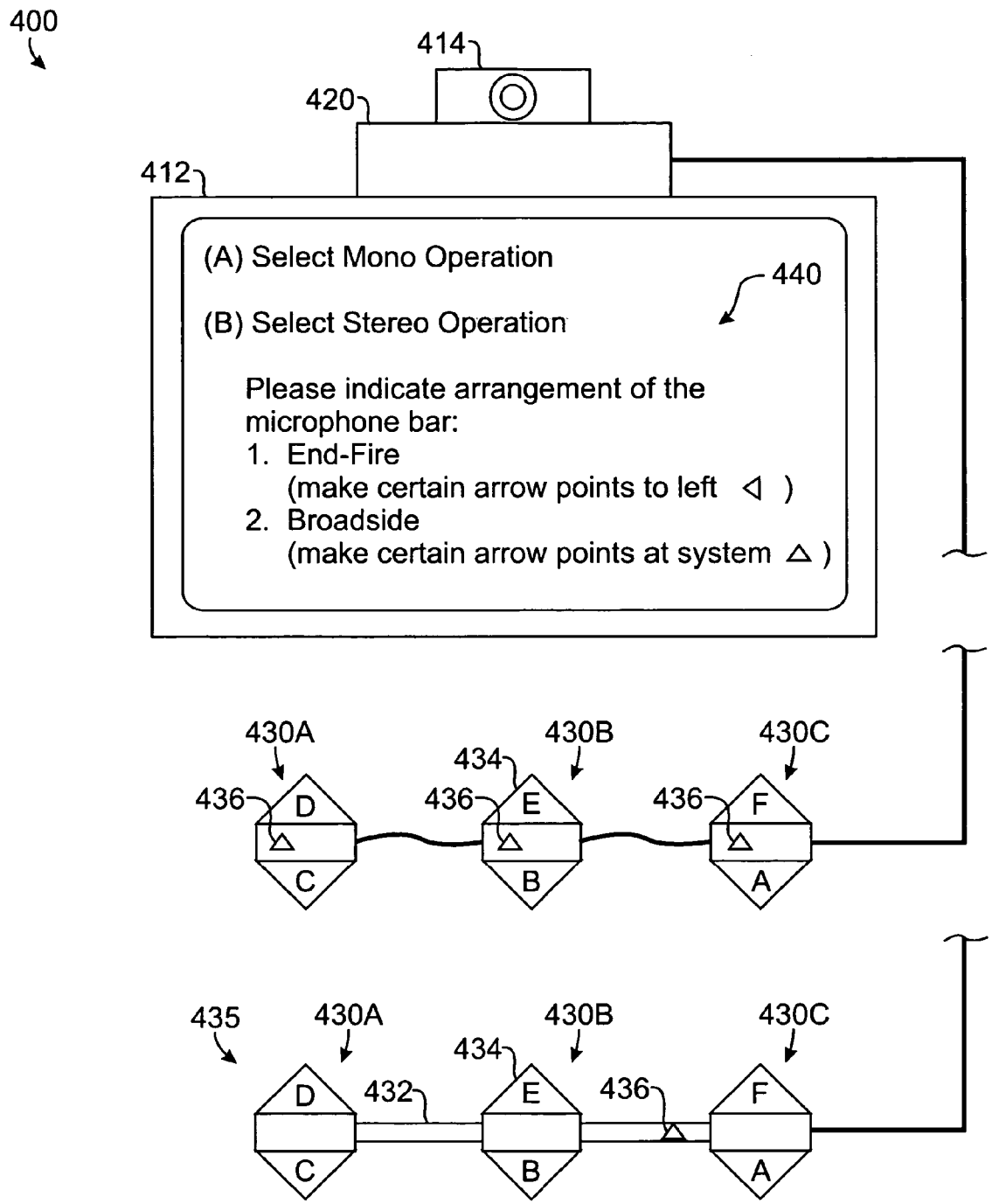
FIG. 9 illustrates an embodiment of a menu for manually selecting the type of audio operation for the disclosed microphone bar.

Referring to FIG. 9, an embodiment of the videoconferencing system 400 for manually selecting the mode of audio operation of microphone modules 430A-C is illustrated. In one embodiment of FIG. 9, the modules 430A-C are shown separate from one another. Also illustrated, however, is another embodiment where the modules 430A-C are physically interconnected together to form a microphone bar 435, such as disclosed above with reference to FIGS. 4A-4B.

The control module of the videoconferencing system 400 includes a menu operation in its software that allows a user to select mono or stereo operation from the display 412 connected to the control unit 420. An example menu screen 440 of the operation is shown on the display 412. Using the controls on the control unit 420 or on a remote, the user selects either mono operation (A) or stereo operation (B) from the menu screen 440. When mono operation (A) is selected, the control unit 420 operates the plurality of microphones 434 on the microphone modules 430A-C by preferably using the gating techniques discussed previously.

When stereo operation (B) is selected, the user also indicates the position of the microphone modules 430A-C relative to the camera 414 and display 412. For example, the user indicates that the microphone modules 430A-C are in the end-fire position (1) or the broadside position (2) from the menu 440. Once the user indicates the orientation of the modules 430A-C, the control unit 420 can operate the microphones 434 according to the corresponding broadside or end-fire mode of stereo operation discussed herein. Thus, the videoconferencing system 400 and microphone modules 430A-C can be set up somewhat arbitrarily in a conference room, and the user can use the menu 440 to operate the microphone modules 430A-C in the way best suited for stereo operation for the arrangement.

The menu screen 440 can have a graphic (e.g., arrow or other insignia) indicating to the user the arrangement of the modules 430A-C in the broadside or end-fire positions. In addition, the microphone modules 430A-C can also have similar graphics 436 (e.g., arrow or other insignia) so that the user can make certain the modules 430A-C and their microphones 434A-C are properly positioned for the selected mode of stereo operation. For example, when selecting the broadside mode of operation 434B, the user can ensure that the arrows 436 on the modules 430A-C point the same direction as on the display 412 so that the active microphones 434A-C will be oriented toward the participants at the table. Similarly, when selecting the end-fire mode of operation (1), the user can ensure that the arrows 436 on the modules 430A-C point the same direction as on the display 412 so that the "left" microphones 434A-C and "right" microphones 434D-CF will be oriented toward the "left" and "right" participants at the table. Having the modules 430A-C physically interconnected together to form the microphone bar 435 simplifies the appropriate arrangement of the modules 430A-C relative to the other portions of the system 400.

Figure 10:
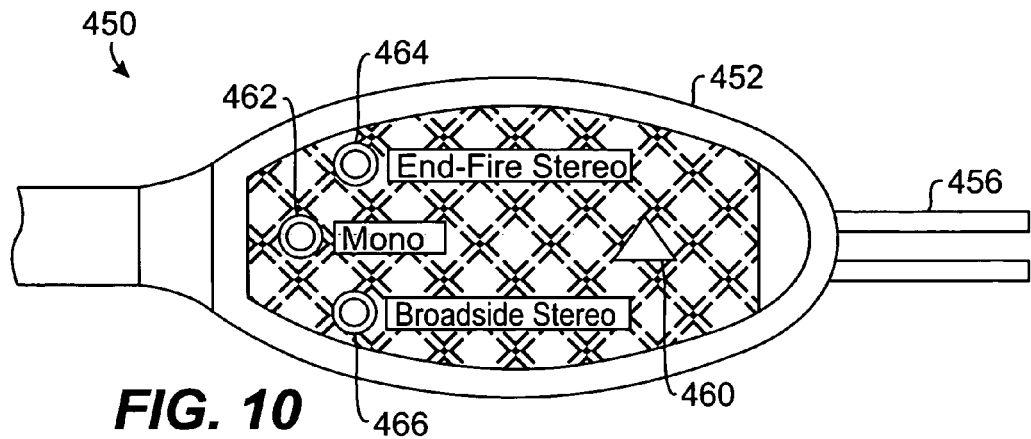
FIG. 10 illustrates an embodiment of a master module of the disclosed microphone bar for manually selecting the type of audio operation.

Referring to FIG. 10, another embodiment for manually selecting the mode of audio operation for the disclosed microphone bar is illustrated. In this embodiment, a master modules 450 of a microphone bar as disclosed herein includes control buttons 462, 464, and 466 for the user to manually select the mode of audio operation. Control button 462 selects mono operation, while control buttons 464 and 466 allow the user to indicate the position of the bar and select either the "broadside mode" or "end-fire mode" of stereo operation. In addition, the master modules 450 has a visual guide 460 for the user to ensure that the master module 450 and hence the other modules of the microphone bar are properly oriented for the mode of stereo operation selected. When initiating a conference, the user can select the control button 462 or 464/464 to set either mono or stereo operation. When selecting stereo operation, the control buttons 464 and 466 can be selected to indicate whether the master module 450 and bar are in a broadside or end-fire position. When the button 464 or 466 is pressed, the electronics (not shown) within the housing 452 of the master module 450 can send a control signal to the control unit (not shown) via lines 22. The control signal can indicate the orientation of the bar set by the user relative to the video display and camera. In turn, the control unit can allocate or de-allocate the necessary audio ports or mix the audio signals from the plurality of microphones according to the selected position of the bar.

Alternatively, the master module 450 can control the signals from microphones within the bar. For example, in the broadside mode of stereo operation, the electronics within the housing 452 of the master module 450 can receive all the signals from the microphones within the bar, but may only send those signals from microphones on one side and the ends of the bar to the control unit. In the end-fire mode of stereo operation, the electronics within the master module 450 can receive all the signals from the microphones within the bar, and can separately mix the signals from each side of the bar and send right and left audio signals to the control unit.

Figure 11:
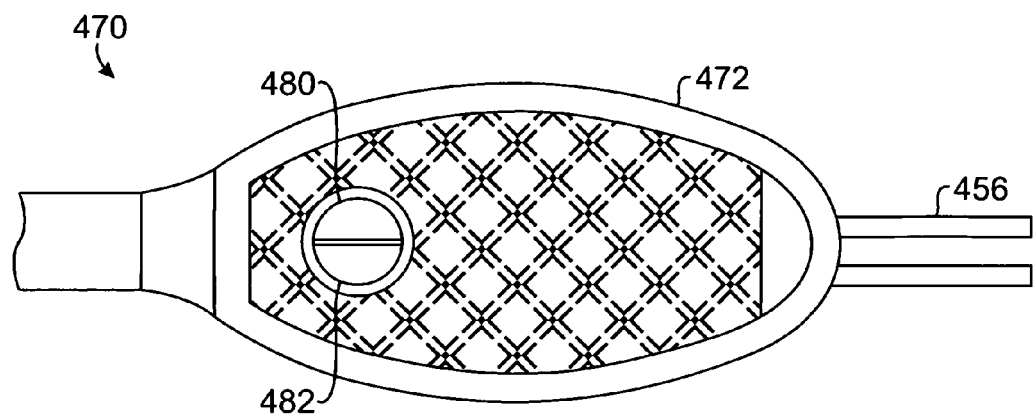
FIG. 11 illustrates an embodiment of the microphone bar for manually operating the microphones during stereo operation.

Referring to FIG. 11, another embodiment for manually setting the mode of stereo operation is illustrated. In this embodiment, a module 470 includes first and second mute buttons 480 and 482. Each mute button 480 and 482 deactivates one of the unidirectional microphones within the housing 472 of the module 470. The other modules (not shown) of the system would also include dual mute buttons for deactivating their pairs of microphones. Thus, when stereo operation is selected using menu operations or other techniques disclosed herein, the user can individually activate and deactivate the various microphones in the modules depending on whether the modules are in a broadside or end-fire position.

Figure 12A:
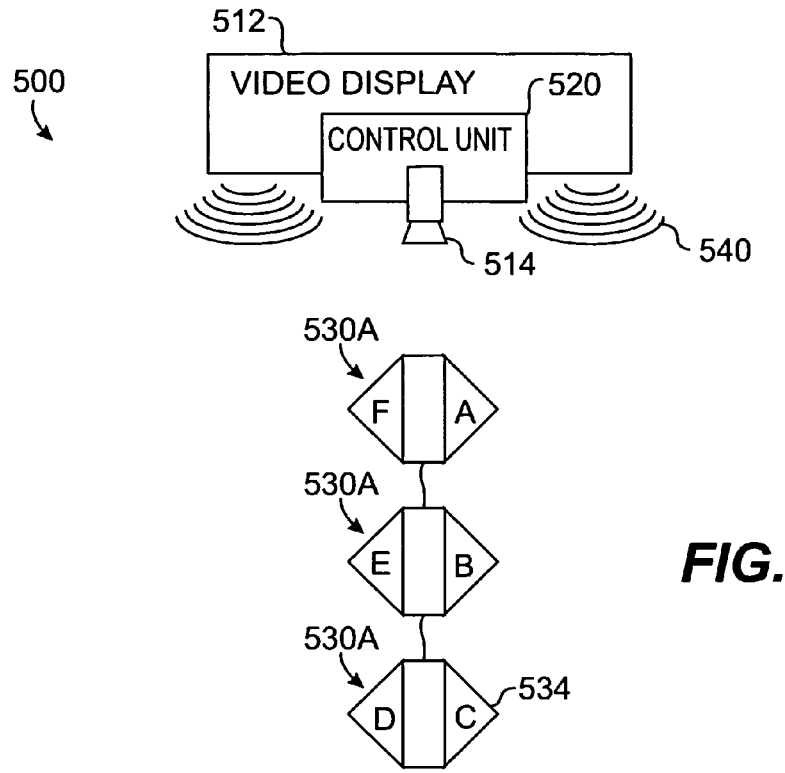
FIGS. 12A-12B illustrate an embodiment of the video conferencing system using tone signals to automatically detect the orientation of the disclosed microphone bar and select the type of stereo operation.
Figure 12B:
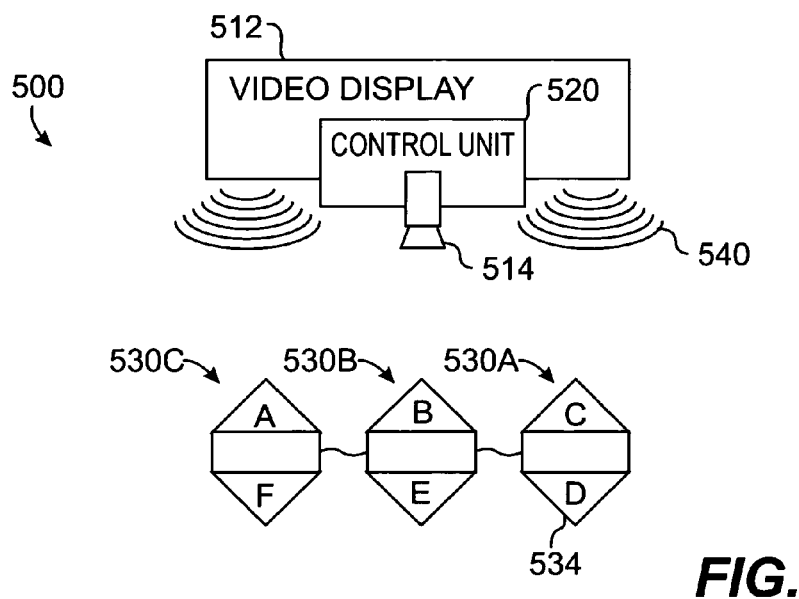

Referring to FIG. 12A-12C, an embodiment of a video conferencing system 500 for automatically selecting the mode of stereo operation of the disclosed microphone modules 530A-C is illustrated. The control unit 520 uses techniques for arbitrating the signals from the plurality of microphones 434A-C to select the one or more microphone signals with the best signal strength, such as disclosed in the incorporated application Ser. No. 10/881,008 entitled "Stereo Microphone Processing for Teleconferencing." The control unit 520 runs a tone calibration sequence at the start of a conference session for stereo operation. In the tone calibration sequence, the control unit 520 sends calibration tones 540 from the speakers of the display 512. Then, the control unit 520 compares the strengths of the signals at the microphones 534 to determine the orientation of the microphone modules 530A-C in either the end-fire position of FIG. 12A or the broadside position of FIG. 12B. In an alternative embodiment, the control unit 520 can compare the delay in the arrival of the tone at the various microphones 534 to determine the orientation of the microphone modules 530A-C.

In the embodiment of FIG. 12A-12C, the microphone modules 530A-C are not physically connected together to form a microphone bar. It will be appreciated that the tone calibration sequence disclosed above would be equally applicable to the microphone modules 530A-C connected together in a microphone bar as disclosed herein.

Figure 13:
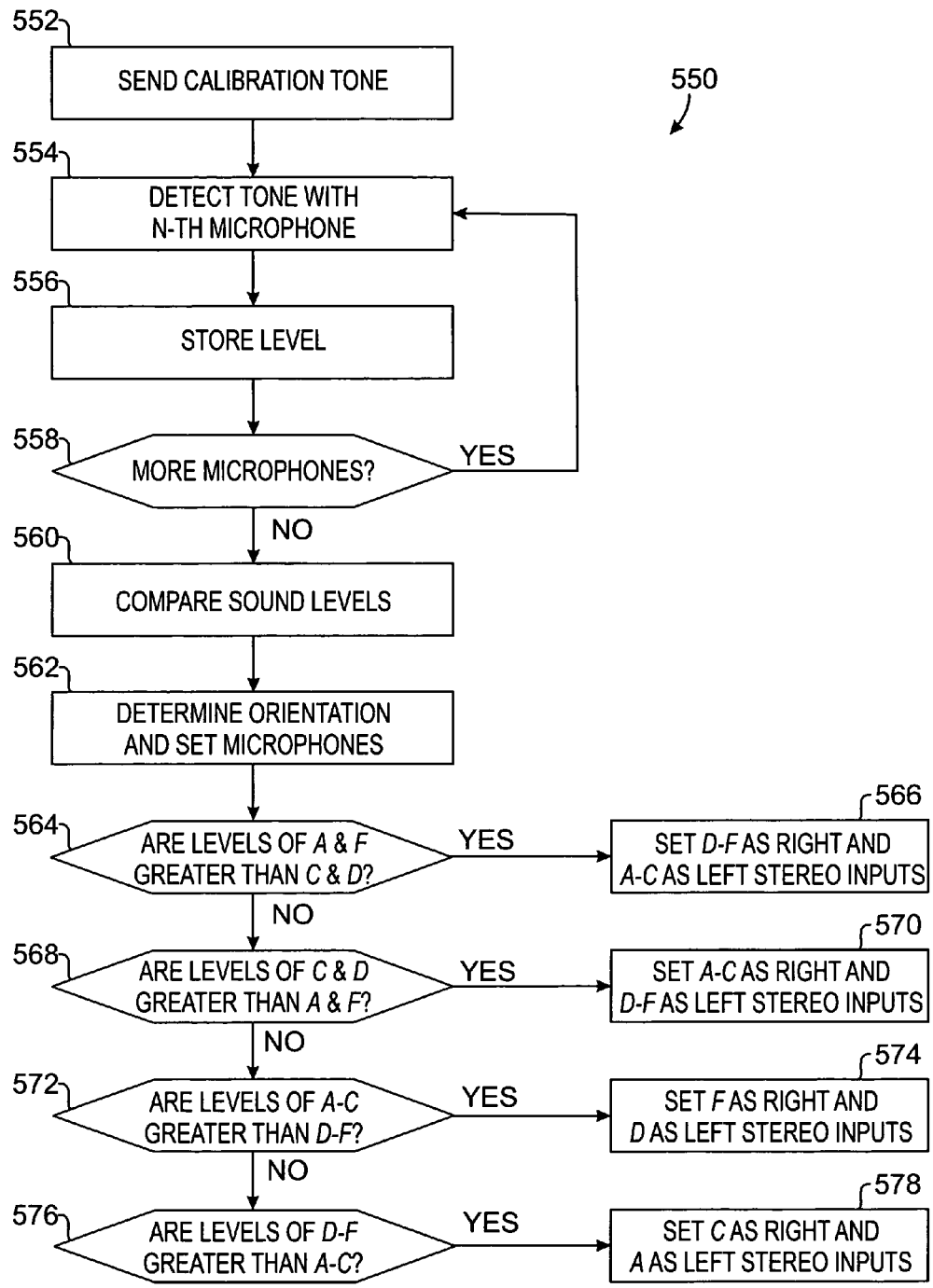
FIG. 13 illustrates an embodiment of a tone sequence for calibrating the video conferencing system of FIGS. 12A-12B.

Referring to FIG. 13, an embodiment of a tone calibration sequence 550 is depicted in flowchart form. As noted above, the control unit sends a calibration tone from the speakers of the display (Block 552). During the calibration tone, the control unit queries a speaker of the microphone bar (Block 554) and stores the signal level at that microphone (Block 556). If more microphones are present (Block 558), the control unit repeats the acts of detecting the tone with a subsequent microphone and storing the level (Blocks 554-556). When the control unit has the levels of the various microphones, the control unit compares the levels (Block 560). In an alternative embodiment noted above, the control unit can obtain the arrival times of the tone at the various microphones and store those times.

From the comparison of the tone levels or arrival times at the various microphones, the control unit determines the orientation of the microphone bar and sets the microphones accordingly for the end-fire or broadside mode of the stereo operation (Block 562). For example, if the levels of microphones (A and C) are greater than the levels of microphones (C and D), then the control unit determines that the microphone bar is in a first end-fire position as shown in FIG. 12A. Accordingly, the control unit sets microphones (D-F) as the right stereo inputs and sets microphones (A-C) as the left stereo inputs (Block 566). If the microphone bar were oriented 180-degrees from what is shown in FIG. 12A, then the control unit could detect the stronger signals and appropriately set the microphones in a reverse arrangement (Blocks 568-570).

On the other hand, if the levels of microphones (A-C) are greater than the levels of microphones (D-F), then the control unit determines that the microphone bar is in the broadside position as shown in FIG. 12B (Block 572). Accordingly, the control unit sets microphone (F) as the right stereo input, sets the microphone (D) as the left stereo input, and de-allocates the other microphones (A-C and E) (Block 574). Again, if the microphone bar were oriented 180-degrees from what is shown in FIG. 12B, then the control unit could detect the stronger signals and appropriately set the microphones in a reverse arrangement (Blocks 576-578).

Figure 14A:
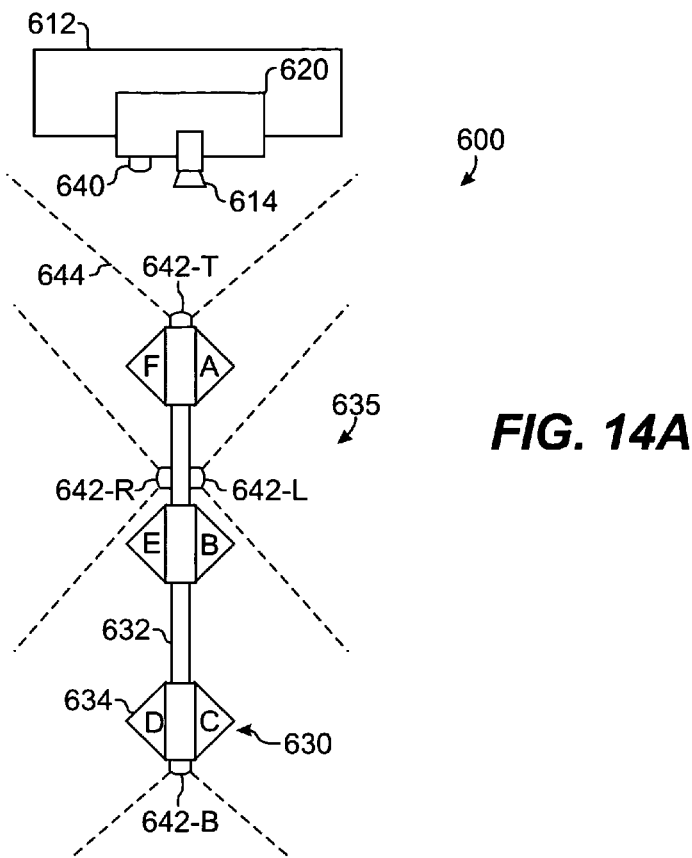
FIGS. 14A-14B illustrate another embodiment of the video conferencing system using light signals to automatically detect the orientation of the disclosed microphone bar and select the type of stereo operation.
Figure 14B:
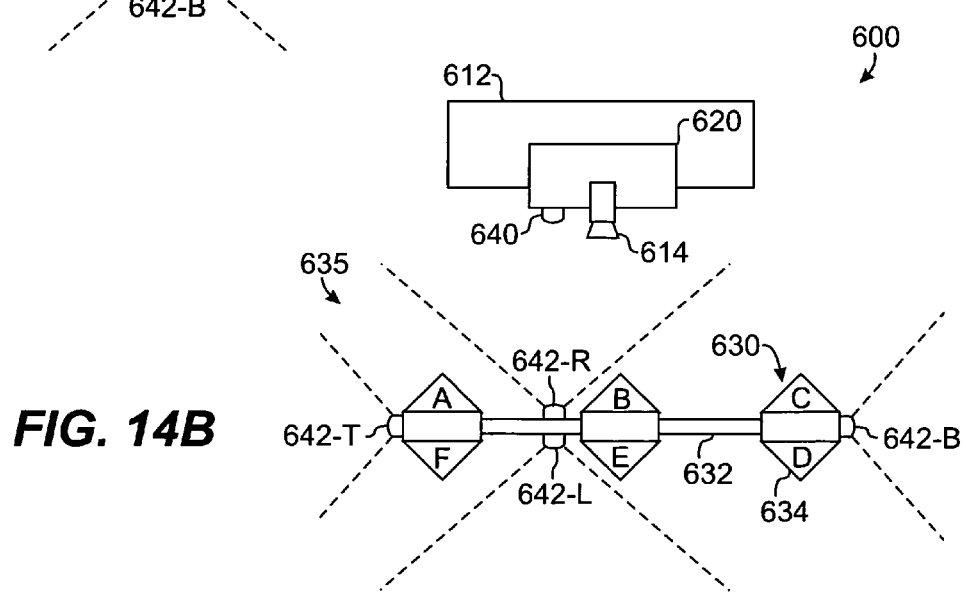

Referring to FIGS. 14A-14B, another embodiment of a videoconferencing system 600 for automatically selecting the mode of stereo operation of the disclosed microphone bar 635 is illustrated. The control unit 620 includes a light detector 640, and the microphone bar 635 includes a plurality of light emitters 642. In the present embodiment, the microphone bar 635 includes four infrared emitters (642-R, 642-L, 642-T, and 642-B) oriented in four orthogonal directions directed away from the microphone bar 635. However, the microphone bar 635 can have more or less emitters. Each of the emitters 642 emits a distinctive infrared signal 644 from the other emitters. For example, each emitter 642 may emit infrared signals 644 with distinct flash patterns. The emitters 642 are arranged so that the signal 644 from only one emitter 642 is detected by the infrared detector 640 on the control unit 620. Thus, when initiating a video conference in stereo, the control unit 620 activates the emitters 642 on the microphone bar 635, and the emitters 640 emit their distinctive infrared signals 644. The control unit 620 then detects which signal arrives at the infrared detector 640 and determines the orientation of the microphone bar 635 from the detected signal.

In the embodiment of FIG. 14A-14C, the microphone modules 630 are physically connected together by connections 632 to form the microphone bar 635. It will be appreciated that the light detection techniques disclosed above would be equally applicable to microphone modules 630 that are not connected together. In such an embodiment, each microphone modules 630 may require a light emitter. Alternatively, only one module may have the light emitter, and the other modules may then need to be appropriately arranged relative to that one module.

Figure 15:
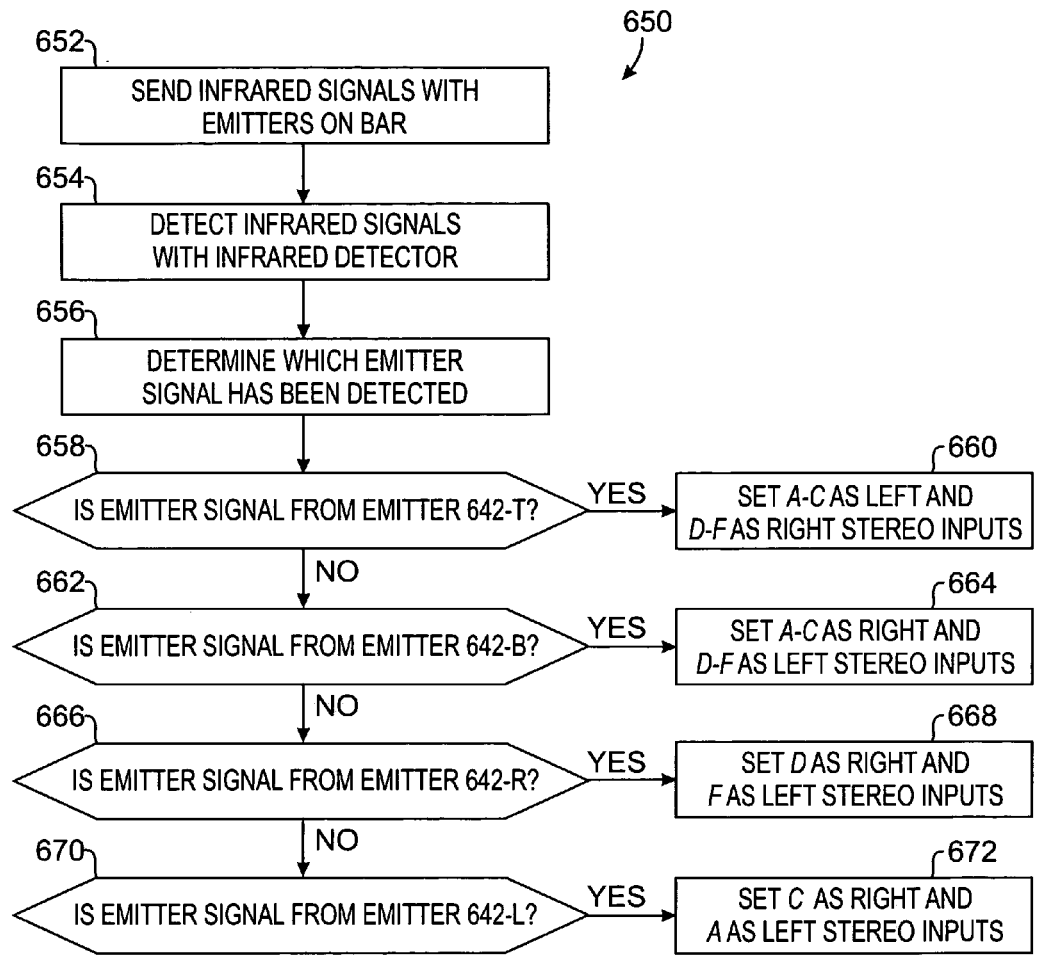
FIG. 15 illustrates an embodiment of a light sequence for calibrating the video conferencing system of FIGS. 14A-14B.

Referring to FIG. 15, an embodiment of the infrared calibration sequence 650 is depicted in flowchart form. As noted above, the emitters on the microphone bar send their infrared signals (Block 652). During the emission, the control unit detects the emitter signal directed at the infrared detector (Block 654) and determines which emitter signal has been detected using the distinctive characteristics of the signal (Block 656). For example, if the emitter signal is from emitter 642-T, then the control unit determines that the microphone bar is in a first end-fire position as shown in FIG. 14A. Accordingly, the control unit sets microphones (A-C) as the left stereo inputs and sets microphones (D-F) as the right stereo inputs (Block 660). If the microphone bar were oriented 180-degrees from what is shown in FIG. 14A, then the control unit could detect the signal from emitter 642-B and appropriately set the microphones in a reverse arrangement (Blocks 662-664).

On the other hand, if the emitter signal is from emitter 642-R, then the control unit determines that the microphone bar is in a first broadside position as shown in FIG. 14B (Block 666). Accordingly, the control unit sets microphone (D) as the right stereo input, sets the microphone (F) as the left stereo input, and de-allocates the other microphones (A-C and E) (Block 668). Again, if the microphone bar were oriented 180-degrees from what is shown in FIG. 14B, then the control unit would detect the signal from emitter 642-L and appropriately set the microphones in a reverse arrangement (Blocks 670-672).

Figure 16A:
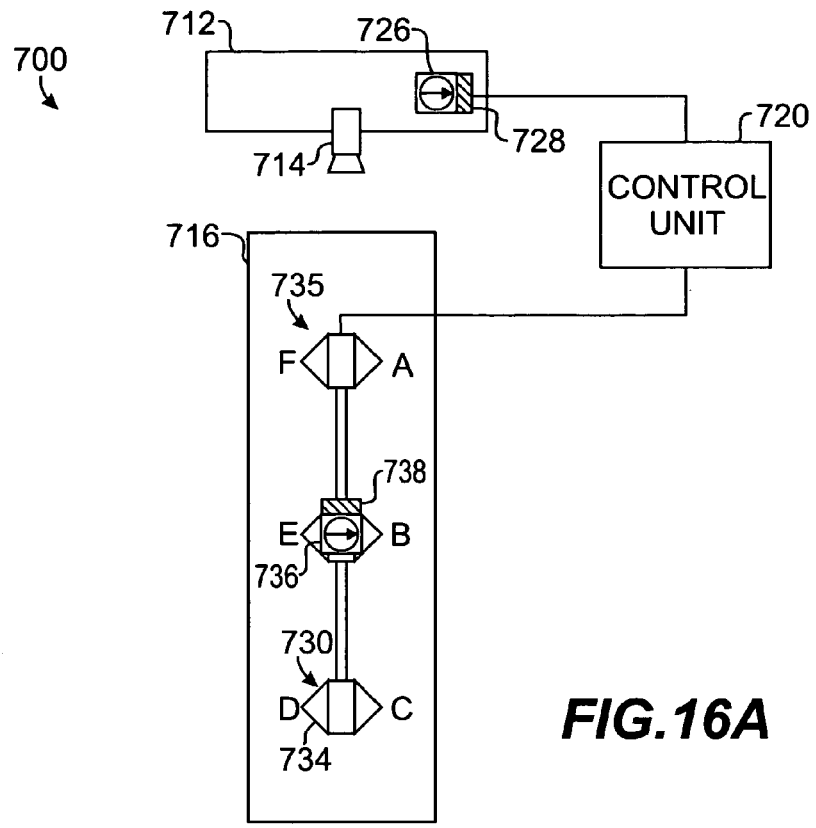
FIGS. 16A-16B illustrate yet another embodiment of the video conferencing system using compass signals to automatically detect the orientation of the disclosed microphone bar and select the type of stereo operation.
Figure 16B:
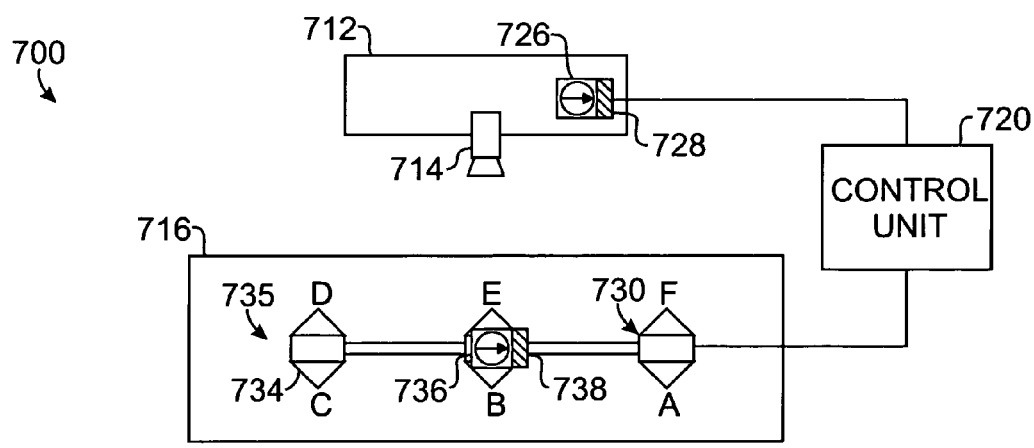

Referring to FIGS. 16A-16B, yet another embodiment of a videoconferencing system 700 for automatically selecting the mode of stereo operation is illustrated. In this embodiment, the video conferencing system 700 includes electronics for determining the orientation of the bar 730 relative to the video display 712 and camera 714. The bar 730 includes an electronic compass 736, which can be a integrated circuit having magnetic field sensors that use the magnetoresistive (MR) effect. One commercially available electronic compass is the Philips Semiconductors KMZ52 MR chip. The control unit 720 is coupled to another electronic compass 726. The electronic compass 726 can be positioned on the camera 714 or alternatively the display 712 if the camera 714 is mounted on the display 712. In addition, the electronic compass 726 can be an internal component of the control unit 720 if the control unit 720 and the camera 714 are an integral unit.

The first compass 736 on the bar 730 determines a first orientation of a reference point 738 on the bar 730 relative to the direction (e.g., "north") detected by the compass 736. In addition, the second compass 726 determines a second orientation of a reference point 728 on the camera 714/display 712/control unit 720 relative to the direction (e.g., "north") detected by the compass 726. These first and second orientations are then compared to determine whether the bar 730 is in an end-fire position (FIG. 16A) or in a broadside position (FIG. 16B). Determining the broadside or end-fire positions requires only about 90-degrees of accuracy. Therefore, the electronic compasses 726 and 736 need only be precise to about four compass headings (e.g., N, S, E, and W) or may be precise to about eight compass headings (e.g., N, NE, E, SE, S, etc.).

In the embodiment of FIGS. 16A-16B, the microphone modules 730 are physically connected together by connections 732 to form the microphone bar 735. It will be appreciated that the electronic detection techniques disclosed above would be equally applicable to microphone modules 730 that are not connected together. In such an embodiment, each microphone module 730 may require an electronic compass. Alternatively, only one module 730 may have the electronic compass, and the other modules may then need to be appropriately arranged physically relative to that one module.

Figure 17:
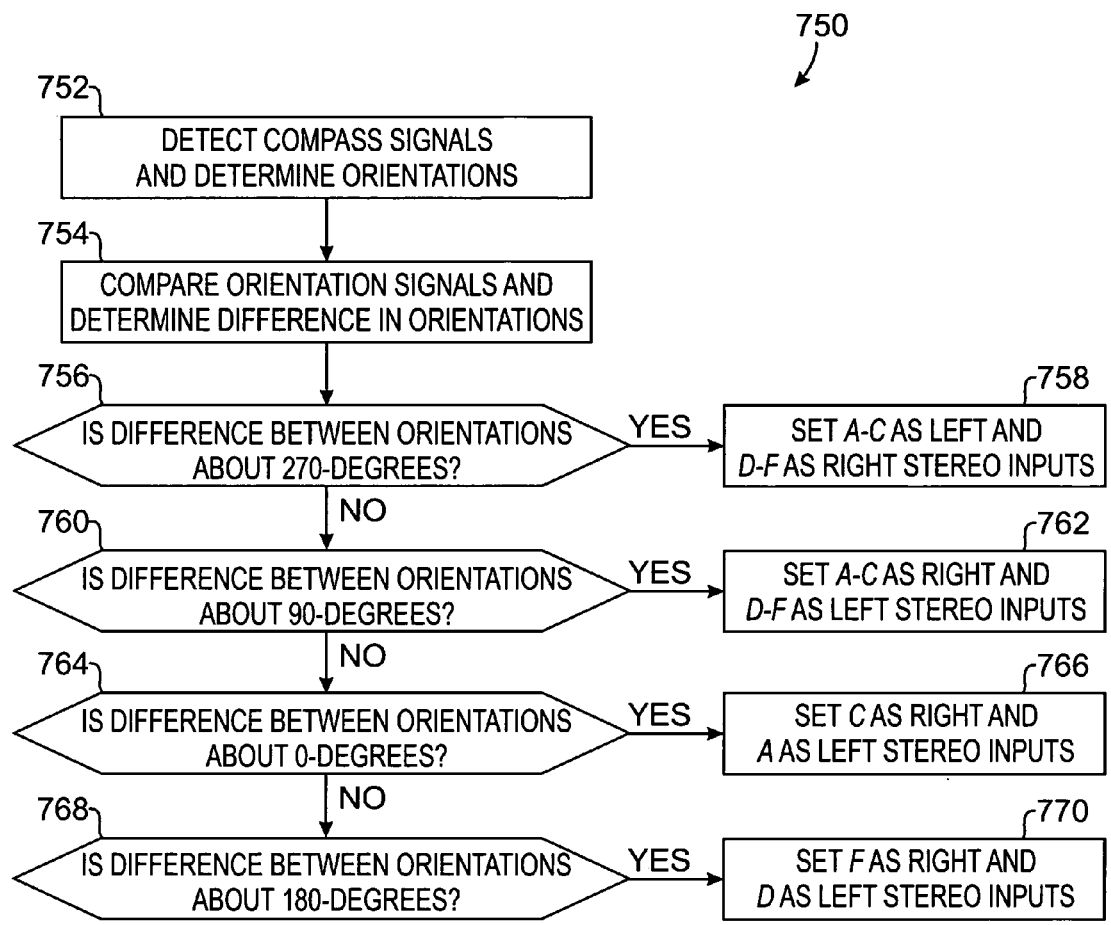
FIG. 17 illustrates an embodiment of a compass sequence for calibrating the video conferencing system of FIGS. 16A-16B.

Referring to FIG. 17, an embodiment of a compass calibration sequence 750 is depicted in flowchart form. The control unit detects the compass signals indicating the orientations of the microphone bar and indicating the orientation of the control unit, camera, and/or display (Block 752). The control unit compares the orientation signals and determines the difference between the orientations (Block 754).

If the difference between the orientations is about 270-degrees, then the microphone bar is in a first end-fire position (Block 756). In FIG. 16A, for example, both compasses 736 and 726 are oriented "north"; however, the reference 728 of the control unit, camera, and/or display is also oriented "north", but the reference 738 of the bar 730 is oriented "west". Therefore, differences in orientation is about 270-degrees (e.g., North being 0-degrees and West being 270-degrees so that W−N=270-degrees), and the control unit would determine that the bar 730 is in an end-fire position. Accordingly, the control unit 720 would activate and mix microphones 734-A through 734-C as left side stereo input and microphones 734-D through 734-F as the right side stereo input (Block 758).

On the other hand, if the difference in orientation is about 90-degrees (e.g., North being 0-degrees and East being 90-degrees so that E−N=90-degrees), then the control unit would determine that the bar 730 is in a reverse end-fire position (Block 760). Accordingly, the control unit would activate and mix microphones 734-A through 734-C as right side stereo input and microphones 734-D through 734-F as left side stereo input (Block 762).

If the difference between the orientations is about 0-degrees, then the microphone bar is in a first broadside position (Block 764). In FIG. 16B, for example, both compasses 736 and 726 are oriented "north"; however, the reference 728 of the control unit, camera, and/or display is also oriented "north", and the reference 738 of the bar 730 is oriented "north". Therefore, differences in orientation is about 0-degrees, and the control unit would determine that the bar 730 is in an end-fire position. Accordingly, the control unit 720 would deactivate microphones 734-D through 734-F and would set 734-C and 743-1 respectively as right and left sides of the stereo input (Block 766).

On the other hand, if the difference in orientation is about 180-degrees (e.g., North being 0-degrees and South being 180-degrees so that S−N=180-degrees), then the control unit would determine that the bar 730 is in a reverse broadside position (Block 768). Accordingly, the control unit 720 would deactivate microphones 734-A through 734-C and would set 734-F and 743-4 respectively as right and left sides of the stereo input (Block 770).

The foregoing description of preferred and other embodiments is not intended to limit or restrict the scope or applicability of the inventive concepts conceived of by the Applicants. For example, although the preferred embodiments have been described with respect to video conferencing systems, the concepts described herein may also find applicability to audio teleconferencing system as well as other multimedia environments. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A video conferencing system having a camera with a view angle, comprising:

a plurality of microphones operable to obtain audio, the microphones being arrangeable along a central axis in at least two radial orientations relative to the view angle of the camera; and a control unit operatively coupled to the camera and the plurality of microphones, the control unit determining which one of the at least two radial orientations the arranged microphones has relative to the view angle of the camera and controlling the audio of the arranged microphones according to one of at least two modes of stereo operation depending on the determined radial orientation;

wherein the at least two modes of stereo operation include a broadside mode of stereo operation when the central axis of the arranged microphones is substantially orthogonal to the view angle of the camera, and wherein in the broadside mode the plurality of microphones on a side of the central axis closest to the camera are deactivated and the plurality of microphones on an opposing side of the central axis are divided into left and right sides of stereo audio input.

2. The system of claim 1, wherein the microphones are physically connected together to form a microphone bar defining the central axis.

3. The system of claim 2, wherein the microphone bar comprises at least two modules, each module housing at least two unidirectional microphones substantially oriented towards opposite sides of the central axis defined by the microphone bar.

4. The system of claim 1, wherein the microphones comprise unidirectional microphones arrangeable along the central axis, whereby:
- a first plurality of the unidirectional microphones are mounted substantially along a first side of the central axis; and
- a second plurality of the unidirectional microphones are mounted substantially along a second side of the central axis.

5. The system of claim 2, wherein the microphone bar comprises at least one module having three cardioid microphones pointing radially outward from the at least one module at about 120-degrees apart from one another.

6. The system of claim 1, wherein the at least two modes of stereo operation include an end-fire mode of stereo operation when the central axis of the arranged microphones is substantially parallel to the view angle of the camera.

7. The system of claim 6, wherein in the end-fire mode the plurality of microphones on one side of the central axis are designated as one side of stereo audio input and the plurality of microphones on an opposing side of the central axis are designated as another side of stereo audio input.

8. The system of claim 1, wherein the control unit is configured to execute a tone operation automatically detecting the radial orientation of the microphones, wherein in the tone operation, the control unit causes a tone to be emitted, and wherein the control unit compares an attribute of the tone detected by two or more of the plurality of microphones to determine the radial orientation of the microphones.

9. The system of claim 1, further comprising:
- a first electronic compass obtaining a first radial orientation of the camera, the control unit, or a display; and
- a second electronic compass obtaining a second radial orientation of the arranged microphones,
- wherein the control unit compares the first and second radial orientations to automatically determine a relative radial orientation of the arranged microphones with respect to the camera, the control unit, or the display.

10. The system of claim 1, further comprising:
- a detector operatively coupled to the control unit; and
- a plurality of emitters mounted adjacent one or more of the microphones, each emitter emitting a signal,
- wherein the control unit determines the radial orientation of the microphones based on the signal detected by the detector.

11. The system of claim 1, wherein to determine the radial orientation of the microphones, the system comprises:
- means for automatically determining the radial orientation of the microphones relative to the view angle of the camera of the videoconferencing systems.

12. The system of claim 11, wherein the means for automatically determining comprises:
- means for emitting a tone with the videoconferencing system;
- means for receiving the tone with the microphones; and
- means for comparing the tones received by the microphones.

13. The system of claim 11, wherein the means for automatically determining comprises:
- means for obtaining a first magnetic orientation of the videoconferencing system;
- means for obtaining a second magnetic orientation of the microphones; and
- means for comparing the first and second magnetic orientations.

14. The system of claim 11, wherein the means for automatically determining comprises:
- means for emitting a plurality of light signals indicative of the radial orientation of the microphones; and
- means for detecting at least one of the light signals.

15. The system of claim 1, wherein to determine the radial orientation of the microphones, the system comprises means for manually selecting the mode of stereo operation.

16. A method of operating a plurality of microphones for a videoconferencing system, the microphones being positionable relative to the videoconferencing system, the method comprising:
- determining with the videoconferencing system a radial orientation of the microphones arranged along a central axis relative to a view angle of a camera of the videoconferencing system;
- selecting one of a plurality of modes of stereo operation for the microphones depending on the determined radial orientation of the microphones; and
- operating the microphones with the videoconferencing system according to the selected mode of stereo operation,
- wherein the modes of stereo operation include a broadside mode of stereo operation when the central axis of the arranged microphones is substantially orthogonal to the view angle of the camera, and
- wherein operating the microphones in the broadside mode comprises—
  - deactivating the microphones on a side of the central axis closest to the camera, and
  - dividing the microphones on an opposing side of the central axis into left and right sides of stereo audio input.

17. The method of claim 16, wherein the act of selecting the mode of stereo operation comprises manually selecting the mode of stereo operation from a menu or button indicating the radial orientation of the microphones.

18. The method of claim 16, wherein the act of determining the radial orientation of the microphones comprises:
- emitting a tone with the videoconferencing system;
- receiving the tone with the microphones; and
- comparing the tones received by the microphones to detect the radial orientation of the microphones.

19. The method of claim 16, wherein the act of determining the radial orientation of the microphones comprises:
- obtaining a first magnetic orientation of the videoconferencing system;
- obtaining a second magnetic orientation of the microphones; and
- comparing the first and second magnetic orientations to detect the radial orientation of the microphones.

20. The method of claim 16, wherein the act of determining the radial orientation of the microphone bar comprises:
- emitting a plurality of light signals indicative of the orientation of the microphones; and
- detecting at least one of the light signals to detect the orientation of the microphones.

21. The method of claim 16, wherein the modes of stereo operation include an end-fire mode of stereo operation when the central axis of the arranged microphones is substantially parallel to the view angle of the camera, and wherein operating the microphones in the end-fire mode comprises—
designating the microphones on one side of the central axis as one side of stereo audio input, and
designating the microphones on an opposing side of the central axis as another side of stereo audio input.

22. A video conferencing system having a camera with a view angle, comprising:
a plurality of microphones operable to obtain audio, the microphones being arrangeable along a central axis in at least two radial orientations relative to the view angle of the camera; and
a control unit operatively coupled to the camera and the plurality of microphones, the control unit determining which one of the at least two radial orientations the arranged microphones has relative to the view angle of the camera and controlling the audio of the arranged microphones according to one of at least two modes of stereo operation depending on the determined radial orientation;
wherein the at least two modes of stereo operation include an end-fire mode of stereo operation when the central axis of the arranged microphones is substantially parallel to the view angle of the camera, and
wherein in the end-fire mode the plurality of microphones on one side of the central axis are designated as one side of stereo audio input and the plurality of microphones on an opposing side of the central axis are designated as another side of stereo audio input.

23. The system of claim 22, wherein the microphones are physically connected together to form a microphone bar defining the central axis.

24. The system of claim 23, wherein the microphone bar comprises at least two modules, each module housing at least two unidirectional microphones substantially oriented towards opposite sides of the central axis defined by the microphone bar.

25. The system of claim 23, wherein the microphone bar comprises at least one module having three cardioid microphones pointing radially outward from the at least one module at about 120-degrees apart from one another.

26. The system of claim 22, wherein the microphones comprise unidirectional microphones arrangeable along the central axis, whereby:
a first plurality of the unidirectional microphones are mounted substantially along a first side of the central axis; and
a second plurality of the unidirectional microphones are mounted substantially along a second side of the central axis.

27. The system of claim 22, wherein the at least two modes of stereo operation include a broadside mode of stereo operation when the central axis of the arranged microphones is substantially orthogonal to the view angle of the camera.

28. The system of claim 22, wherein the control unit is configured to execute a tone operation automatically detecting the radial orientation of the microphones, wherein in the tone operation, the control unit causes a tone to be emitted, and wherein the control unit compares an attribute of the tone detected by two or more of the plurality of microphones to determine the radial orientation of the microphones.

29. The system of claim 22, further comprising:
a first electronic compass obtaining a first radial orientation of the camera, the control unit, or a display; and
a second electronic compass obtaining a second radial orientation of the arranged microphones,
wherein the control unit compares the first and second radial orientations to automatically determine a relative radial orientation of the arranged microphones with respect to the camera, the control unit, or the display.

30. The system of claim 22, further comprising:
a detector operatively coupled to the control unit; and
a plurality of emitters mounted adjacent one or more of the microphones, each emitter emitting a signal,
wherein the control unit determines the radial orientation of the microphones based on the signal detected by the detector.

31. The system of claim 22, wherein to determine the radial orientation of the microphones, the system comprises means for manually selecting the mode of stereo operation.

32. The system of claim 22, wherein to determine the radial orientation of the microphones, the system comprises means for automatically determining the radial orientation of the microphones relative to the view angle of the camera of the videoconferencing system.

33. The system of claim 32, wherein the means for automatically determining comprises:
means for emitting a tone with the videoconferencing system;
means for receiving the tone with the microphones; and
means for comparing the tones received by the microphones.

34. The system of claim 32, wherein the means for automatically determining comprises:
means for obtaining a first magnetic orientation of the videoconferencing system;
means for obtaining a second magnetic orientation of the microphones; and
means for comparing the first and second magnetic orientations.

35. The system of claim 32, wherein the means for automatically determining comprises:
means for emitting a plurality of light signals indicative of the radial orientation of the microphones; and
means for detecting at least one of the light signals.

36. A method of operating a plurality of microphones for a videoconferencing system, the microphones being positionable relative to the videoconferencing system, the method comprising:
determining with the videoconferencing system a radial orientation of the microphones arranged along a central axis relative to a view angle of a camera of the videoconferencing system;
selecting one of a plurality of modes of stereo operation for the microphones depending on the determined radial orientation of the microphones; and
operating the microphones with the videoconferencing system according to the selected mode of stereo operation,
wherein the modes of stereo operation include an end-fire mode of stereo operation when the central axis of the arranged microphones is substantially parallel to the view angle of the camera, and
wherein operating the microphones in the end-fire mode comprises—
designating the microphones on one side of the central axis as one side of stereo audio input, and
designating the microphones on an opposing side of the central axis as another side of stereo audio input.

37. The method of claim 36, wherein the act of selecting the mode of stereo operation comprises manually selecting the mode of stereo operation from a menu or button indicating the radial orientation of the microphones.

38. The method of claim 36, wherein the act of determining the radial orientation of the microphones comprises:
  emitting a tone with the videoconferencing system;
  receiving the tone with the microphones; and
  comparing the tones received by the microphones to detect the radial orientation of the microphones.

39. The method of claim 36, wherein the act of determining the radial orientation of the microphones comprises:
  obtaining a first magnetic orientation of the videoconferencing system;
  obtaining a second magnetic orientation of the microphones; and
  comparing the first and second magnetic orientations to detect the radial orientation of the microphones.

40. The method of claim 36, wherein the act of determining the radial orientation of the microphone bar comprises:
  emitting a plurality of light signals indicative of the orientation of the microphones; and
  detecting at least one of the light signals to detect the orientation of the microphones.

\* \* \* \* \*

UNITED STATES PATENT AND TRADEMARK OFFICE
CERTIFICATE OF CORRECTION

PATENT NO. : 7,646,876 B2
APPLICATION NO. : 11/095900
DATED : January 12, 2010
INVENTOR(S) : Chu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1296 days.

Signed and Sealed this

Twenty-first Day of September, 2010

David J. Kappos
*Director of the United States Patent and Trademark Office*